(12) United States Patent
Adler et al.

(10) Patent No.: US 7,962,962 B2
(45) Date of Patent: Jun. 14, 2011

(54) USING AN OBJECT MODEL TO IMPROVE HANDLING OF PERSONALLY IDENTIFIABLE INFORMATION

(75) Inventors: Steven B. Adler, Port Washington, NY (US); Endre Felix Bangerter, Ligerz (CH); Kathryn Ann Bohrer, Austin, TX (US); Nigel Howard Julian Brown, Richmond Hill (CA); Jan Camenisch, Ruschlikon (CH); Arthur M. Gilbert, Bethel, CT (US); Dogan Kesdogan, White Plains, NY (US); Matthew P. Leonard, Upper Saddle River, NJ (US); Xuan Liu, Yorktown Heights, NY (US); Michael Robert McCullough, Washington, DC (US); Adam Charles Nelson, Chicago, IL (US); Charles Campbell Palmer, Goldens Bridge, NY (US); Calvin Stacy Powers, Chapel Hill, NC (US); Michael Schnyder, Bern (CH); Edith Schonberg, New York City, NY (US); Matthias Schunter, Oldenburg (DE); Elsie Van Herreweghen, Adiswil (CH); Michael Waidner, Appitacsh (CH)

(73) Assignee: International Business Machines Corporation, Armonk, NY (US)

( * ) Notice: Subject to any disclaimer, the term of this patent is extended or adjusted under 35 U.S.C. 154(b) by 1932 days.

(21) Appl. No.: 09/884,311

(22) Filed: Jun. 19, 2001

(65) Prior Publication Data

US 2003/0004734 A1 Jan. 2, 2003

(51) Int. Cl.
*G06F 21/00* (2006.01)
*G06F 7/04* (2006.01)
*G06F 17/30* (2006.01)

(52) U.S. Cl. .......................................... 726/27; 713/182
(58) Field of Classification Search .................. 707/102, 707/100; 717/102, 104, 165, 147; 713/167, 713/166, 193, 182; 726/1, 27; 705/3, 1
See application file for complete search history.

(56) References Cited

U.S. PATENT DOCUMENTS
5,109,337 A 4/1992 Ferriter et al.
(Continued)

FOREIGN PATENT DOCUMENTS
EP 1081916 A2 3/2001

OTHER PUBLICATIONS
Principles of Object Oriented Analysis and Design, James Martin, 1993.*
(Continued)

*Primary Examiner* — Benjamin E Lanier
*Assistant Examiner* — Hadi Armouche
(74) *Attorney, Agent, or Firm* — Stephen J. Waldar, Jr.; Mark C. Vallone

(57) ABSTRACT

In a computer, a first set of object classes are provided representing active entities in an information-handling process and a second set of object classes are provided representing data and rules in the information-handling process. At least one object class has rules associated with data. The above-mentioned objects are used in constructing a model of an information-handling process, and to provide an output that identifies at least one way in which the information-handling process could be improved. One aspect is a method for handling personally identifiable information. Another aspect is a system for executing the method of the present invention. A third aspect is as a set of instructions on a computer-usable medium, or resident in a computer system, for executing the method of the present invention.

21 Claims, 11 Drawing Sheets

U.S. PATENT DOCUMENTS

| | | | |
|---|---|---|---|
| 5,614,927 A * | 3/1997 | Gifford et al. | 715/531 |
| 5,630,125 A | 5/1997 | Zellweger | |
| 5,689,565 A | 11/1997 | Spies et al. | |
| 5,720,033 A | 2/1998 | Deo | |
| 5,787,427 A * | 7/1998 | Benantar et al. | 707/9 |
| 5,797,128 A * | 8/1998 | Birnbaum | 707/5 |
| 5,809,415 A * | 9/1998 | Rossmann | 455/422.1 |
| 5,892,900 A | 4/1999 | Ginter et al. | |
| 5,899,995 A | 5/1999 | Millier et al. | |
| 6,044,349 A * | 3/2000 | Tolopka et al. | 705/1 |
| 6,112,181 A | 8/2000 | Shear et al. | |
| 6,138,119 A | 10/2000 | Hall et al. | |
| 6,182,067 B1 | 1/2001 | Presnell et al. | |
| 6,223,094 B1 | 4/2001 | Muehleck et al. | |
| 6,253,203 B1 | 6/2001 | O'Flaherty et al. | |
| 6,275,824 B1 | 8/2001 | O'Flaherty et al | |
| 6,377,983 B1 | 4/2002 | Cohen et al. | |
| 6,463,417 B1 * | 10/2002 | Schoenberg | 705/2 |
| 6,471,068 B1 | 10/2002 | Kido et al. | |
| 6,480,850 B1 | 11/2002 | Veldhuisen | |
| 6,636,858 B1 | 10/2003 | Coffey et al. | |
| 7,069,427 B2 | 6/2006 | Adler et al. | |
| 7,093,286 B1 * | 8/2006 | King | 726/12 |
| 7,478,157 B2 | 1/2009 | Bohrer et al. | |
| 7,603,317 B2 | 10/2009 | Adler et al. | |
| 2001/0054067 A1 * | 12/2001 | Miller et al. | 709/203 |
| 2001/0054155 A1 | 12/2001 | Hagan et al. | |
| 2002/0010784 A1 | 1/2002 | Clayton et al. | |
| 2002/0029254 A1 | 3/2002 | Davis et al. | |
| 2002/0035697 A1 | 3/2002 | McCurdy et al. | |
| 2002/0087472 A1 | 7/2002 | Walter | |
| 2002/0091741 A1 | 7/2002 | Ferreira et al. | |
| 2003/0014418 A1 * | 1/2003 | Adler et al. | 707/100 |
| 2003/0014654 A1 * | 1/2003 | Adler et al. | 713/200 |
| 2004/0049571 A1 | 3/2004 | Johnson et al. | |
| 2004/0088415 A1 | 5/2004 | Chandrasekar et al. | |

OTHER PUBLICATIONS

Kroenke, David M., "Database Processing: Fundamentals, Design and Implementation", (c) 1999 7th ed. Prentice-Hall, Inc., New Jersey, 1999, pp. 49-68.

USPTO U.S. Appl. No. 09/884,153, Image File Wrapper printed Apr. 19, 2010, 2 pages.

USPTO U.S. Appl. No. 09/884,296, Image File Wrapper printed Apr. 19, 2010, 3 pages.

USPTO U.S. Appl. No. 10/046,034, Image File Wrapper printed Jun. 8, 2010, 2 pages.

PentaSafe Security Technologies, Inc., wysiwyg://3http://www.pentasafe.com/products/vspm.htm, Accessed Oct. 16, 2001, pp. 1-4.

"Brodia Personal Commerce Manager", http://portal.brodia.com/brodia/service/app_Home.htm, Accessed Oct. 16, 2001, p. 1.

"Digitalme Making Life Easier on the Net", Novell, wysiwyg://12http://www.digitalme.com/Press_Materials/Backgrounder/ . . . ,Accessed Oct. 16, 2001, pp. 1-3.

"IDcide—PrivacyWall Site Analyzer", 2001, pp. 1-2.

"IDcide—PrivacyWall Site Monitor", 2001, pp. 1-2.

"Microsoft .Net My Services", http://www.microsoft.com/myservices/services/userexperiences.asp, Accessed Oct. 16, 2001, pp. 1-11.

"Persona—(p)—CRM Internet Marketing Platform", http://www.privaseek.com/products_pcrm.html, Accessed Oct. 16, 2001, p. 1.

"PrivacyRight Products", 2001, p. 1.

"Tivoli Privacy Manager", 2001, pp. 1-2.

"What is a Superprofile", Lumeria—SuperProfile, http://www.superprofile.com/sprofile.html, Accessed Oct. 16, 2001, p. 1.

"Zeroknowledge—Freedom Internet Privacy and Security Software", http://www.freedom.net/products/standard/index.html?product=standard, Accessed Oct. 16, 2001, pp. 1-3.

Notice of Allowance dated Oct. 3, 2005 for U.S. Appl. No. 09/884,153.

Final Office Action dated Jun. 1, 2005 for U.S. Appl. No. 09/884,153.

Non-Final Office Action dated Nov. 5, 2004 for U.S. Appl. No. 09/884,153.

Notice of Allowance dated Jun. 3, 2009 for U.S. Appl. No. 09/884,296.

Final Office Action dated Mar. 2, 2009 for U.S. Appl. No. 09/884,296.

2nd or Subsuquent Examiner's Answer dated Dec. 9, 2008 for U.S. Appl. No. 09/884,296.

Examiner's Answer dated Apr. 21, 2006 for U.S. Appl. No. 09/884,296.

Examiner's Answer dated Feb. 9, 2005 for U.S. Appl. No. 09/884,296.

Final Office Action dated Sep. 9, 2004 for U.S. Appl. No. 09/884,296.

Non-Final Office Action dated Feb. 20, 2004 for U.S. Appl. No. 09/884,296.

Notice of Allowance dated Jul. 23, 2008 for U.S. Appl. No. 10/046,034.

Final Office Action dated Feb. 4, 2008 for U.S. Appl. No. 10/046,034.

Non-Final Office Action dated Oct. 5, 2007 for U.S. Appl. No. 10/046,034.

Non-Final Office Action dated May 14, 2007 for U.S. Appl. No. 11/039,534.

Final Office Action dated Oct. 26, 2007 for U.S. Appl. No. 11/039,534.

Examiner's Answer dated Jun. 20, 2008 for U.S. Appl. No. 11/039,534.

Board Decision dated Sep. 27, 2010 for U.S. Appl. No. 11/039,534.

Kroenke, David M., Database Processing: Fundamentals, Design and Implementation: (c) 1999; 7th Ed. Prentice-Hall, Inc. New Jersey pp. 49-68.

* cited by examiner

Empty Form: = Form Fields + Privacy Policy
Filled Form: = Empty Form + Collected Data

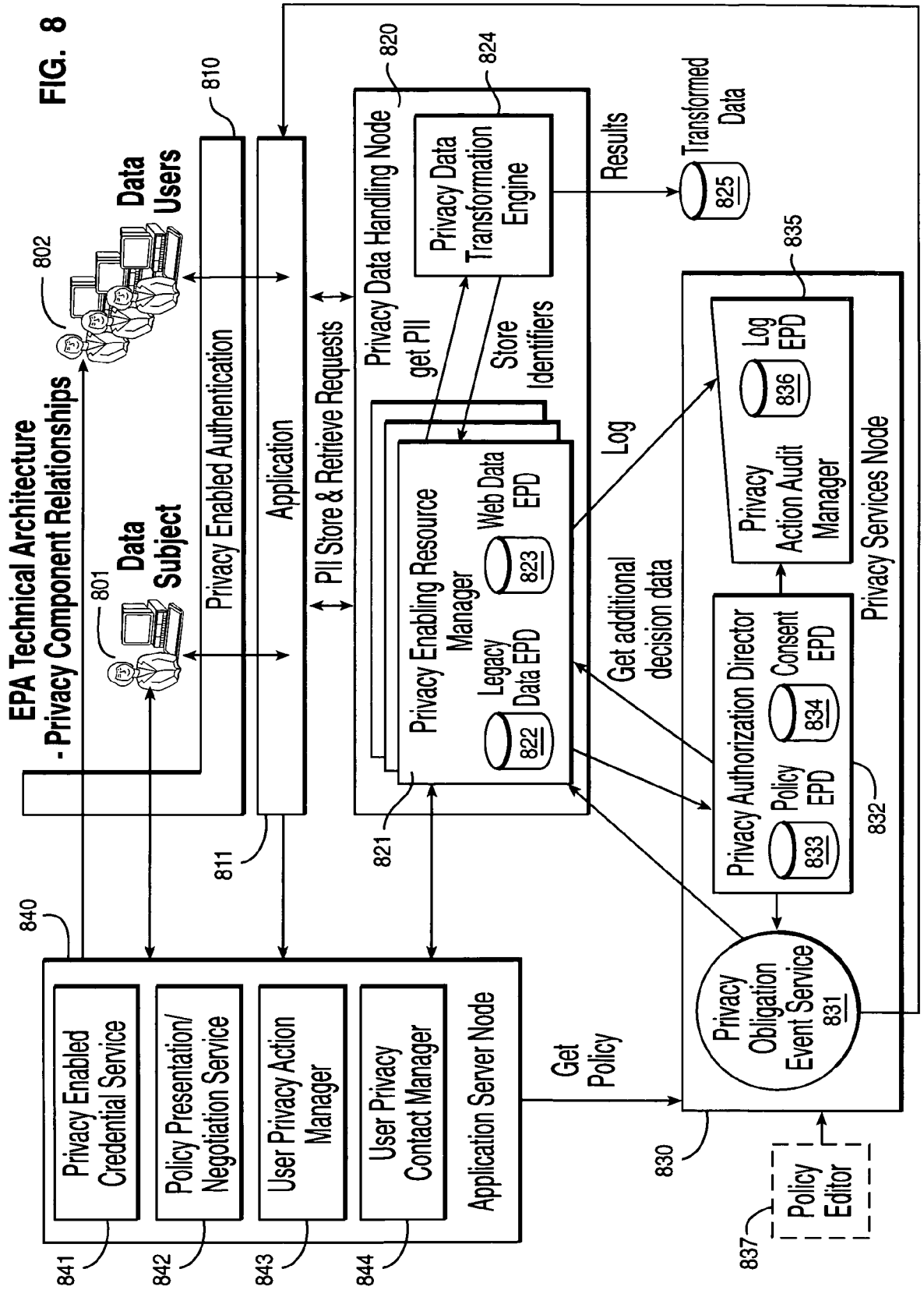

ns to the teachings of the present invention.

USING AN OBJECT MODEL TO IMPROVE HANDLING OF PERSONALLY IDENTIFIABLE INFORMATION

CROSS-REFERENCES TO RELATED APPLICATIONS, AND COPYRIGHT NOTICE

The present application is related to co-pending applications entitled Using a Privacy Agreement Framework to Improve Handling of Personally Identifiable Information, Ser. No. 09/884,296, and Using a Rules Model to Improve Handling of Personally Identifiable Information, Ser. No. 09/884,153, filed on even date herewith, assigned to the assignee of the present application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling, and more particularly to methods and systems to improve handling of personally identifiable information.

BACKGROUND OF THE INVENTION

Many approaches to information handling have been proposed in the past. Regarding approaches to storing data in a way that is useful for some process, examples include U.S. Pat. No. 5,109,337 (Ferriter, et al., Apr. 28, 1992), which relates to a manufacturing effort or hardware design. It discloses a "conceptual design tool method" that involves storing manufacturing information in a database, and generating a parts list. Another example is U.S. Pat. No. 6,223,094 B1 (Muehleck et al., Apr. 24, 2001), which relates to manufacturing (of vehicles, for example) and discloses a data structure, with multiple layers, for products, components, and manufacturing processes.

Regarding approaches to storing data in a way that allows control over access and use of the data (e.g. access is allowed or not allowed, according to a rule), examples include U.S. Pat. No. 6,112,181 (Shear et al., Aug. 29, 2000), which relates to the transmission ("narrowcasting") of selected digital information, associated with "rights management information" or rules and controls. The "rights management information" mainly concerns commercial use: e.g. payment, membership cards, creation of an audit record, creation of a derivative work. Another example is U.S. Pat. No. 6,138,119 (Hall et al., Oct. 24, 2000), which discloses a descriptive data structure, and data packaged with rules in a secure container.

However, the above-mentioned examples address substantially different problems, and thus are significantly different from the present invention.

In light of laws and public concern regarding privacy, there is a need for systems and methods to improve the handling of personally identifiable information.

SUMMARY OF THE INVENTION

Regarding the present invention, one set of features involves handling personally identifiable information, by (1) providing in a computer a first set of object classes representing active entities in an information-handling process, wherein a limited number of privacy-related actions represent operations performed on data; (2) providing in the computer a second set of object classes representing data and rules in the information-handling process, wherein at least one object class has rules associated with data; and (3) handling transactions involving personally identifiable information, using the computer and object classes. A second set of features involves using the above-mentioned objects in constructing a model of an information-handling process, and providing output that identifies ways in which personally identifiable information could be better handled.

One advantage of the invention is that it provides a way to enforce privacy policy at the process level either manually or via automation. For example, a model could be constructed on paper first. Then the instantiated object model could be used as the basis for a design that could be implemented via computer. As another example, an information-handling process could be improved by using the model.

The present invention uses terminology from International Business Machine Corporation's Enterprise Privacy Architecture (EPA). This architecture describes a model and a terminology for describing and handling personally identifiable information (PII). The present invention may apply to any process of handling PII by any person or organization, including those engaged in commerce, medicine, science, education, government, law enforcement, insurance, and finance. The concepts of an empty form for gathering data under a specified policy, and a filled form for representing the gathered data along with the policy, are used when describing data actions. The concept of the empty form may be implemented by various techniques for gathering data and specifying policy, such as printed policy statements and email or phone contact. The concept of the filled form may be implemented in any way of capturing input data and storing it, associated with the policy. The main actors in EPA are a data subject (i.e. the person who is described by the PII) and one or more data users (e.g. different organizations or individuals). EPA uses a limited set of privacy-related actions: access, disclose, release, notify, utilize, update, withdrawConsent, giveConsent, delete, anonymize, depersonalize, and repersonalize.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

FIG. 8 is a block diagram illustrating an example of an information handling system that may be used to practice the present invention.

DETAILED DESCRIPTION

Figure 1:
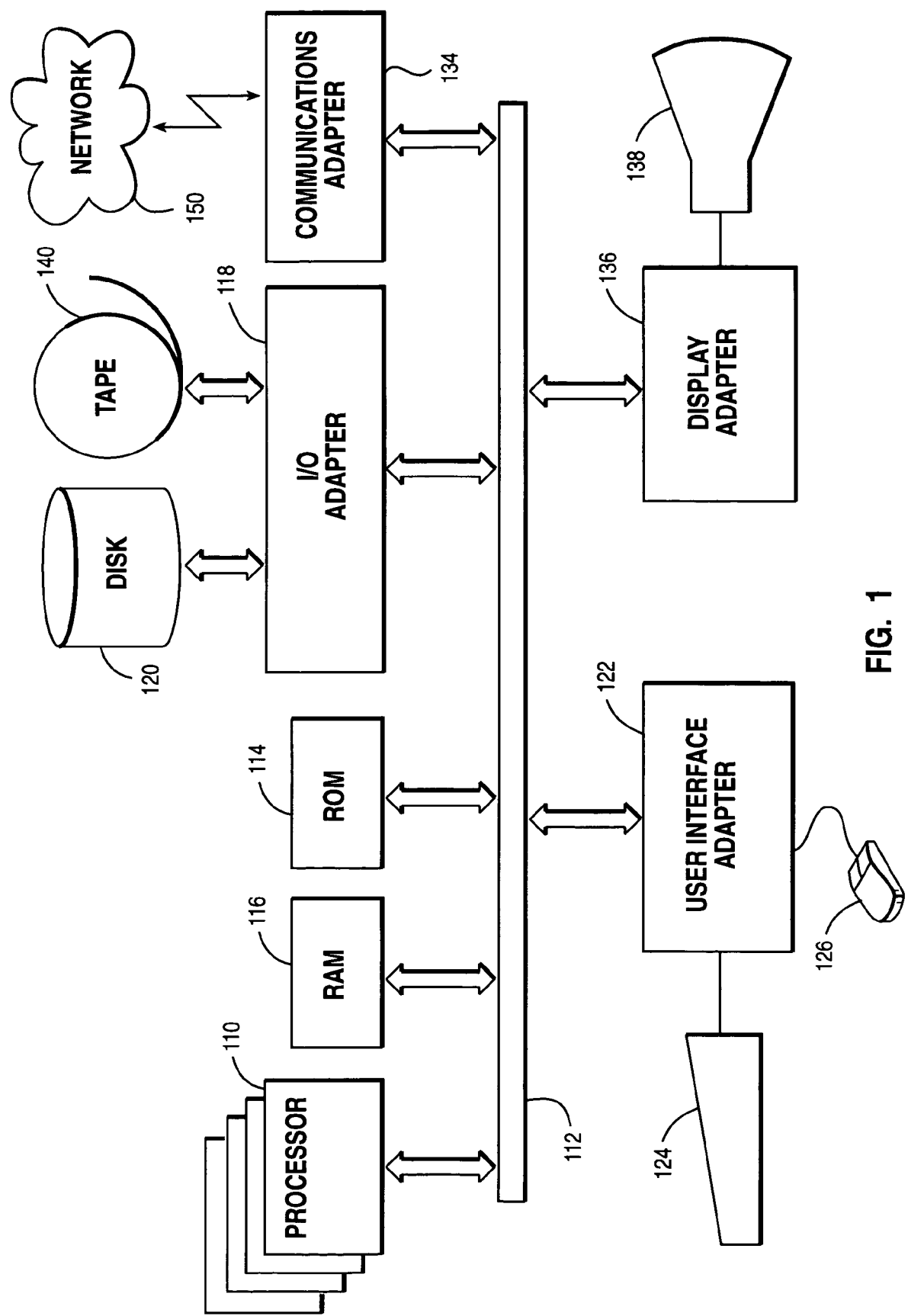
FIG. 1 illustrates a simplified example of an information handling system that may be used to practice the present invention.

The examples that follow involve the use of computers and a network. The present invention is not limited as to the type of computer on which it runs, and not limited as to the type of network used. Various implementation methods may be used for the present invention. The examples that follow involve information that is communicated between computers; this information could be in hypertext markup language (HTML), or extensible markup language (XML), or some other language or protocol could be used.

XML provides a way of containing and managing information that is designed to handle data exchange among various data systems. Thus it is well-suited to implementation of the present invention. Reference is made to the book by Elliotte Rusty Harold and W. Scott Means, *XML in a Nutshell* (O'Reilly & Associates, 2001). As a general rule XML messages use "attributes" to contain information about data, and "elements" to contain the actual data.

The following are definitions of terms used in the description of the present invention and in the claims:
Attribute: The term that is used to describe the passive aspects of classes/objects in Object Oriented Design/Programming. It may be seen as the equivalent of a data field in a database record (which is called attribute since the introduction of relational databases). An attribute can take values of a certain type (like integer number, string etc.).
Class: In Object Oriented Design/Programming, the term class is used to describe the type of an object. It is defined by its properties (mainly the attributes and methods) and the action of actually creating an object in concrete cases is called instantiation.
"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.
Data Subject: The party (individual or under some legislation also legal entity) whose data is being collected and processed and whose privacy we are dealing with
Data User: The party who is processing data (processing in the sense as defined by the European Data Protection Directive covering all steps from collection to deletion.)
EPA: Enterprise Privacy Architecture.
EU Data Protection Directive: Directive 95/46/EC of the European Parliament and of the Council of 24 Oct. 1995 on the protection of individuals with regard to the processing of personal data and on the free movement of such data.
Guardian: The party who is the legal representative of a Data Subject, usually a minor or mentally handicapped person.
Model: An abstracted representation of some subset of reality. In the present context the subset is created by selecting the aspects of reality that are relevant to privacy.
Object: This term is used for the "living" instantiation of a class.
Personally Identifiable Information (PII) is defined as "Any information relating to an identified or identifiable natural person ('data subject')." An identifiable person is one who can be "identified, directly or indirectly, in particular by reference to an identification number or to one or more factors specific to his physical, physiological, mental, economic, cultural or social category." (From the EU Data Directive.)
"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

FIG. 1 illustrates a simplified example of an information handling system that may be used to practice the present invention. The invention may be implemented on a variety of hardware platforms, including personal computers, workstations, servers, and embedded systems. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112, user interface adapter 122 for connecting keyboard 124, mouse 126 or other user interface devices to bus 112, communication adapter 134 for connecting the information handling system to a data processing network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as Intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
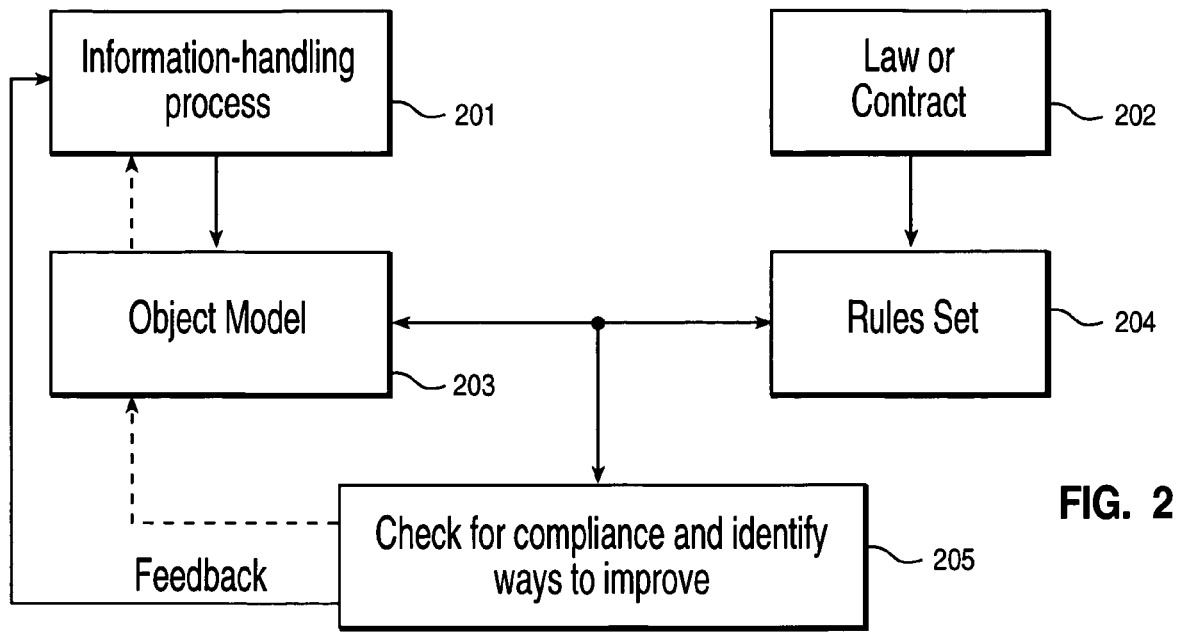
FIG. 2 is a diagram with a feedback loop illustrating an example of a method for improving the handling of Personally Identifiable Information, according to the teachings of the present invention.

FIG. 2 is a diagram illustrating an example of a method for improving the handling of Personally Identifiable Information, according to the teachings of the present invention. On one hand is an information-handling process, at block 201, (a business process for example) which is modeled by an object model at block 203. On the other hand exist laws or contracts, at block 202, from which a rules set at block 204 is derived. At block 205, object model 203 and rules set 204 are compared; actions taken at block 205 are checking for compliance, and identifying ways to improve the information-handling process. The result is feedback to the information-handling process, at block 201. There may be feedback to the object model at block 203 for adaptation purposes.

Figure 3:
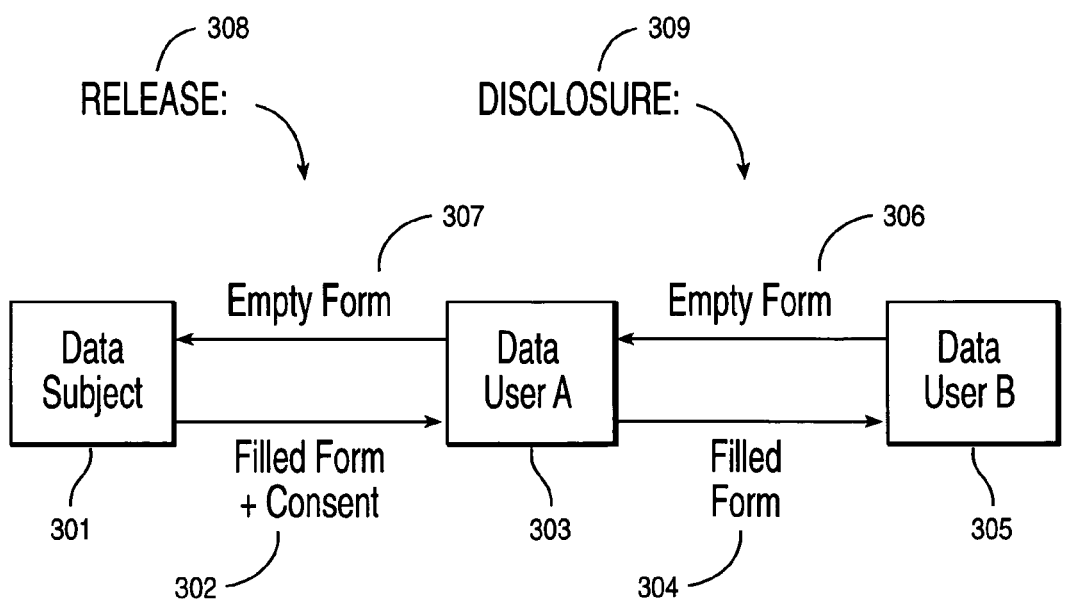
FIG. 3 is a diagram illustrating an example of a method for handling Personally Identifiable Information, along with key terms and concepts, such as an empty form and a filled form, according to the teachings of the present invention.

FIG. 3 is a diagram illustrating an example of a method for handling Personally Identifiable Information, along with key terms and concepts, according to the teachings of the present invention. The concepts of an empty form, 306 or 307, for gathering data under a specified policy, and a filled form 304 for representing the gathered data along with the policy, are used when describing data actions. The concept of the empty form, 306 or 307, may be implemented by various techniques for gathering data and specifying policy, such as printed policy statements and email or phone contact. The concept of the filled form 304 may be implemented in any way of capturing input data and storing it, associated with the policy. The main actors in EPA are a data subject 301 (i.e. the person who is described by the PII) and one or more data users, 303 or 304 (e.g. different organizations or individuals). Initially, a data user 303 asks a data subject 301 to release data, 308. This done by first sending an empty form 307 that contains fields to fill in, as well as a privacy policy. Then the data subject 301 returns a filled form 302 that contains his or her PII along with the associated policy. PII always is associated with policy. Later, a data user 303 may want to send the data to another data user 305. This is called disclosure, 309. A data user 305 sends an empty form 306 including a policy. The data user 303 checks to see whether a disclosure to this data user 305 under the given policy is allowed. If so, the data is filled into the empty form 306 and the resulting filled form 304 is sent to the other data user 305. A privacy policy contains a set of rules that are specific to a data user such as 303 or 305. Each rule allows a privacy action on personal data within specified constraints. EPA defines twelve privacy actions. The privacy actions described by the policy rules define the purpose for which data can be utilized and disclosed. Constraints may require consent from the data subject 301 before the action is allowed, or rules may allow consent to be withdrawn. This supports opt-in or opt-out choices for the data subject 301.

Figure 4:
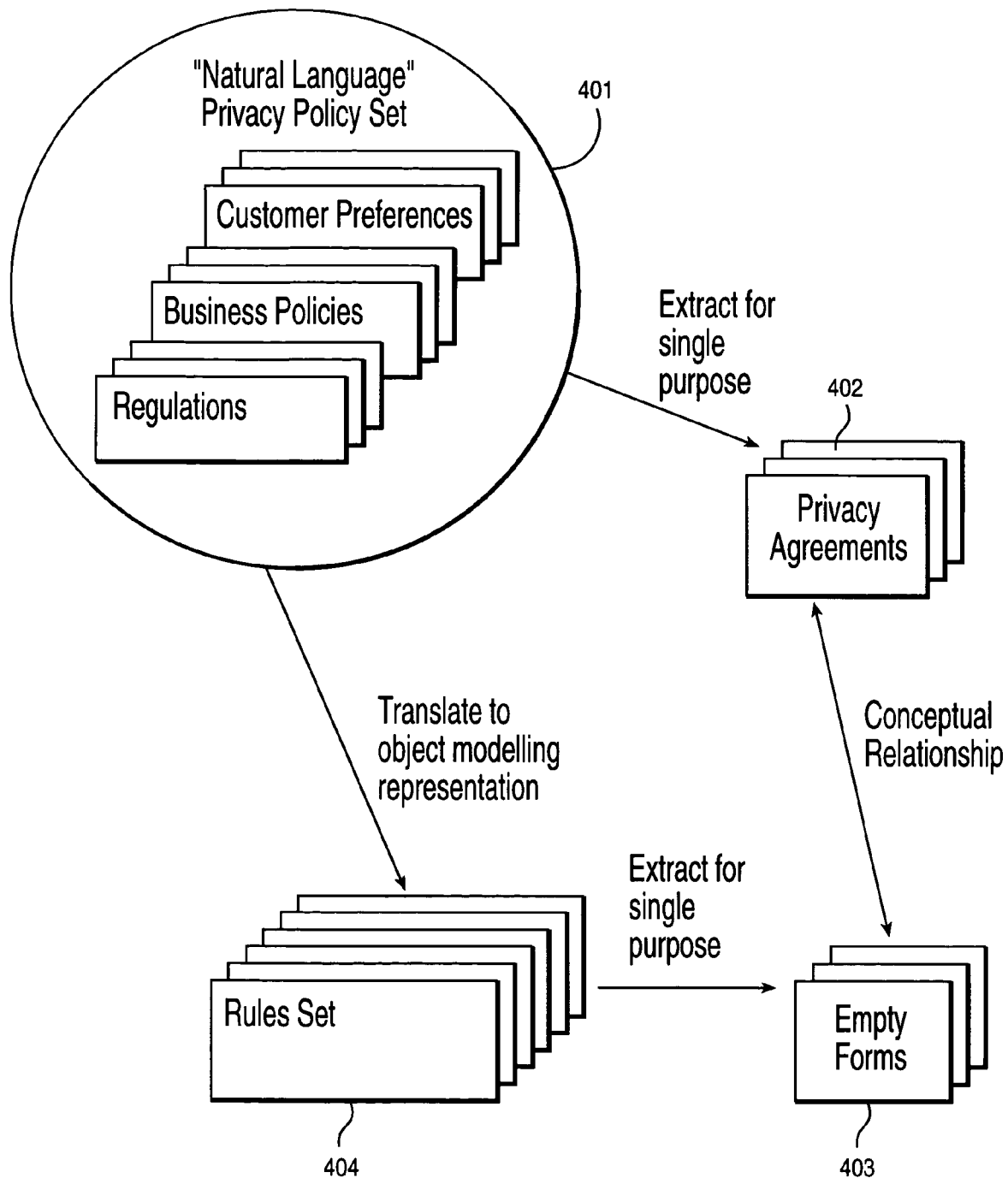
FIG. 4 is a diagram illustrating an example of a method for improving the handling of Personally Identifiable Information, along with key terms and concepts such as an empty form and a privacy agreement, according to the teachings of the present invention.

FIG. 4 is a diagram illustrating an example of a method for improving the handling of Personally Identifiable Information, along with key terms and concepts, according to the teachings of the present invention. The present invention provides an object called an Empty Form, shown at 403, that describes what is allowed to happen to data. The present invention provides an equivalent entity called a privacy agreement, shown at 402, to capture real life privacy relationships. Privacy agreements 402 are derived from natural language privacy policy set 401, which may include regulations, business policies, and customer preferences, for example. Rules set 404 also is derived from natural language privacy policy set 401, through translation to object modeling representation. Empty Forms 403 are derived from rules set 404. A privacy agreement 402 is a subset of the natural language privacy policy set 401 that constitute an organization's privacy policy; the subset is specific to a particular situation or purpose, just as an Empty Form, shown at 403, is a subset of the rules set 404 specific to a particular situation or purpose.

The difference is that the privacy agreement 402 is specific to the two parties involved, whereas the Empty Form, shown at 403, is specific to the data. Rules set 404, Empty Forms 403, and privacy agreements 402 are useful for analyzing and improving the handling of Personally Identifiable Information.

Figure 5:
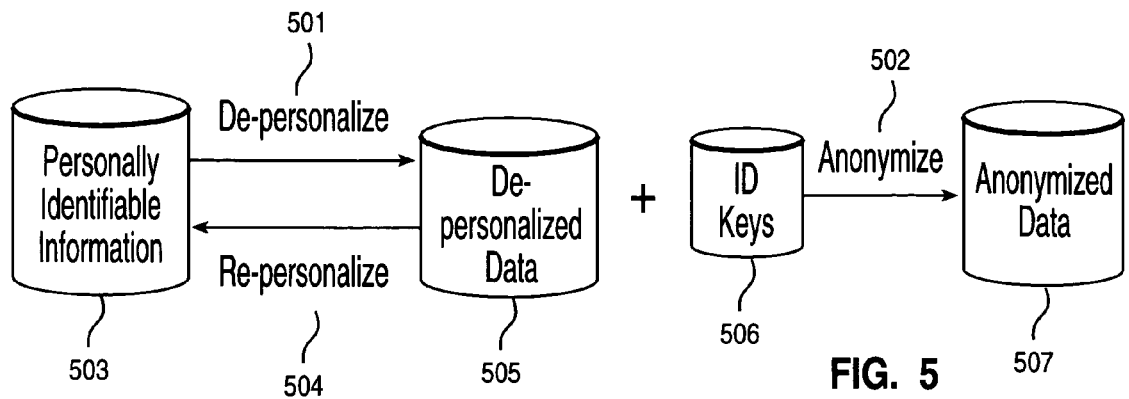
FIG. 5 is a diagram illustrating an example of a method for handling Personally Identifiable Information, along with key terms and concepts, according to the teachings of the present invention; a mechanism for transforming data between three main categories is shown in FIG. 5.

FIG. 5 is a diagram illustrating an example of a method for handling Personally Identifiable Information, along with key terms and concepts, according to the teachings of the present invention. The twelve privacy-relevant actions, according to the teachings of the present invention, describe the actions that can be taken on the different categories of data, and three of them actually provide a mechanism for transforming data between three main categories as shown in FIG. 5. Personally Identifiable Information (PII) 503 is defined as "Any information relating to an identified or identifiable natural person ('data subject')." An identifiable person is one who can be "identified, directly or indirectly, in particular by reference to an identification number or to one or more factors specific to his physical, physiological, mental, economic, cultural or social category." (From the EU Data Directive.) PII 503 is any data, or combination of data, that can be used to identify a person. In an online bookstore, for example, any record that contains the subscriber's full name or exact address is PII 503.

De-Personalized Data 505 is PII where the link to the data subject is not visible, and cannot be established without knowing some additional information 506 (like the correspondence between a pseudonym and the real name and address of the data subject). Data can be already collected in depersonalized form (e.g., under a pseudonym), or generated from PII 503 by detaching all identifying elements 506, on a temporary basis. This can facilitate analysis, reporting and other uses of information that do not require the ability to specifically identify the data subject. Knowing the additional linking information 506, depersonalized data 505 can be reconstituted into a PII 503 form.

In an online bookstore, for example, an order number together with the list of books in that order would be depersonalized data 505, while this data together with the information on which subscriber created that order would be PII 503.

Removing all identifying elements, by process anonymize 502, transforms PII 503 and depersonalized data 505 into anonymized data 507. This type of information is often aggregated for reporting purposes. Since it can still provide a transaction level view, an enterprise is able to plan and understand their customer set and operations effectively while ensuring a high level of protection for the data subject.

In an online bookstore, for example, this would be data that can be held by the marketing department to identify the top book sold in a particular city. The Marketing Department would not need the actual name of the subscribers who bought that book, just that "subscribers" bought that book in, say, Chicago. The PII 503 would have to be cleansed of all identifiers by another department (e.g. Billing Department) before the Marketing Department would gain access to it.

In addition to this categorization of data, the EPA Data Model provides the following sub-categories for various types of contextual data that constitute PII 503 when connected with a name (this is consistent with the framework introduced by P3P, Platform for Privacy Preferences, an industry consortium working on automated communication of privacy preferences).

Roles & Responsibilities
Physical Contact
Online Contact
Non-Governmental Unique Identifiers
Government-Issued Identifiers Purchase and Transactional Information
Financial Information
Computer Information
Navigation and Click-stream Data
Interactive Data
Demographic and Socioeconomic Data
Organizational Characteristics
Communication Content
State Management Mechanisms
Political Information
Health Information
Preference Data
Location Data
Other These sub-categories have been defined in detail and provide a basis for data de-personalization and provide additional useful terminology that can be used in designing specific EPA objects (e.g., privacy agreements) in a standardized and reusable way.

Figure 6:
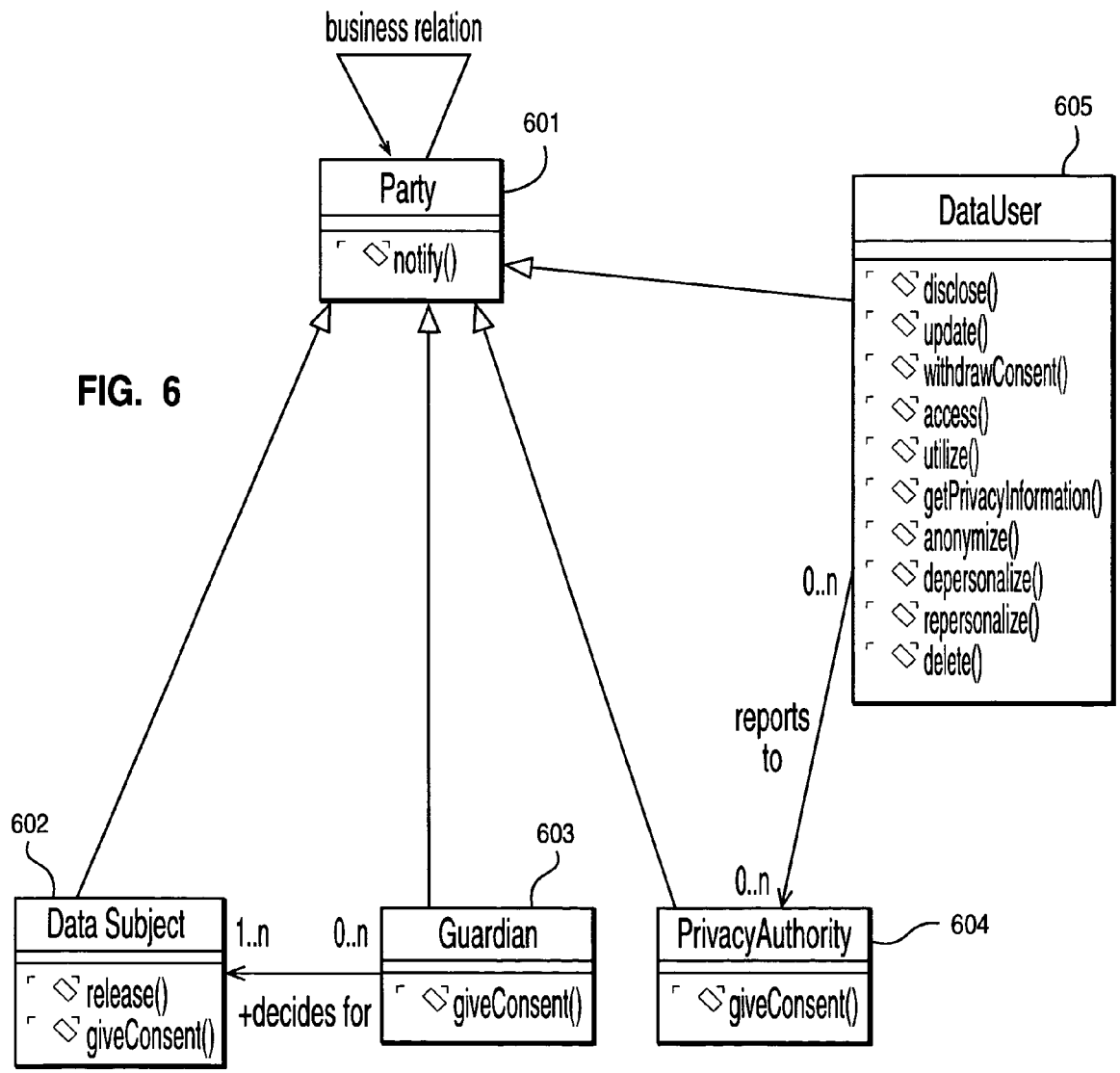
FIG. 6 is a class diagram illustrating objects to be used in a process for improving the handling of Personally Identifiable Information, according to the teachings of the present invention. In particular, FIG. 6 uses Unified Modeling Language (UML) to show classes representing active entities like human beings or legal entities.

FIG. 6 is a class diagram illustrating objects to be used in a process for improving the handling of Personally Identifiable Information, according to the teachings of the present invention. FIG. 6 uses Unified Modeling Language (UML), the de facto standard in Business Object Modeling. In particular, FIG. 6 shows classes representing active entities like human beings or legal entities. Inheritance relationships are shown by lines that have a triangle on the end by the parent or superclass. Regarding FIG. 6, the term "method" has a special meaning. The term "method" is used for active aspects or behaviors of classes or objects in Object-Oriented Design or Programming. Usually a method is looked at as a service that is being provided by the object in question and requested by another object sending a message to the object.

The twelve privacy-relevant actions by active entities are shown as services being provided by the objects in FIG. 6.

Notify( ): This method is present at the Party 601 level, that is, all subclasses of Party 601 are capable of performing the corresponding action. The method executes in the object receiving notification (and could therefore be called "receive_notification"). In the model, the method is triggered (or its execution is requested) by the DataUser 605 whereas the method itself executes in the object receiving notification (DataSubject 602 or PrivacyAuthority 604). Consider the following examples; execution by DataSubject 602: Many laws obligate physicians to report cases of infectious diseases (e.g. tuberculosis) to health authorities. Now, for reasons of transparency and in the interest of a good relationship between patient and physician, the doctor will let his patient know what data is being transmitted to whom and for what purposes (he will notify the patient about this fact). The notify( ) method will be executed by the patient.

Consider execution by Guardian 603: According to COPPA (Children's Online Privacy Protection Act) the DataUser who is running a website targeting children must make notify the parents about the fact that he is collecting information from their child and about the purposes of processing. The notify( ) method is executed by the Guardian 603 and triggered by DataUser 605.

Consider execution by PrivacyAuthority 604: The Swiss Data Protection Law (article 6 §2) asks the DataUser to notify the Data Protection Commissioner about certain cases of transborder communication of personal information. The notify( ) method is executed by the PrivacyAuthority 604.

Consider execution by DataUser 605: When a DataUser 605 finds out that some personal information he processes is erroneous, he may find it appropriate to notify( ) the source from where he collected this information.

GiveConsent( ): This method is present in the classes DataSubject 602, Guardian 603 and PrivacyAuthority 604. In the model, its execution is requested by a DataUser 605. Executing this method means expressing consent for a specified use of a certain set of personal information. Consider the following examples execution by DataSubject 602: The customer (DataSubject) of a shop (DataUser) agrees that his address may be used for marketing purposes by this data user.

Consider execution by Guardian 603: According to COPPA (Children's Online Privacy Protection Act) the DataUser who is running a website targeting children must make an effort to obtain parental consent for the collection, use and disclosure of child's personal information. If this effort is successful, the Guardian 603 can giveConsent( ) for the proposed purpose.

Consider execution by PrivacyAuthority 604: In some countries PrivacyAuthority 604 has the power to authorize the processing of personal information. One might argue that this is not exactly an act of giving consent, but basically what the PrivacyAuthority 604 does in this case, is to substitute the consent of the DataSubject which is why the giveConsent( ) is present in the PrivacyAuthority 604 class.

Release( ): This method is specific to the DataSubject 602 in the sense that only objects of this class contain it. The execution of the method may be triggered by the DataSubject 602's own will or by a request from a DataUser 605. The execution of the method is the DataSubject 602's action of releasing his personal information to a Data User. Consider the following example: When applying for car insurance DataSubject 602 fills out a form and sends it to the insurance company (DataUser 605) and thereby releases personal information.

Disclose( ): This method is only present in objects of class DataUser 605. It is triggered by the request coming from another DataUser 605 and its execution is the action of communicating data to that other DataUser 605. Note that the method can stand for a communication across enterprise boundaries as well as for communications internal to an enterprise. Consider the following examples: A physician reports cases of tuberculosis to the public health authorities thereby disclosing patients' information. An HR employee is being asked by a clerk of the accounting department to communicate to him all information he has on a certain other employee. This example shows a) that it makes sense to have rules concerning disclosures internal to an enterprise and b) that it makes sense to have an enterprise modeled as more than one single DataUser 605.

Update( ): This method is present in the DataUser 605 class and corresponds to the action of modifying data. Consider the following example: The owner of a shop (DataUser) updates a customer's (DataSubject) address. Note that this update can take place upon request by the DataSubject 602 or by the DataUser 605 autonomously.

WithdrawConsent( ): When the DataSubject withdraws his consent, e.g. with respect to a certain purpose of processing (cf. example below), then this method is executed by the DataUser 605 (upon request from the DataSubject 602). The method may, however, also be triggered by another DataUser 605 who has the obligation to propagate the consent withdrawal. The counter-intuitive name of this method deserves a comment: In the real world, it is obvious that the withdrawal of consent is an action that the DataSubject is executing. It does, however, not make a great deal of sense to introduce this method into the model (because it is never triggered by another method, but always by the individual's own free will). On the other hand, the naming follows a pattern frequently encountered in system design: If an object performs a method, which again triggers a method of another object, then they frequently are given the same name. This does not lead to misunderstandings, because the full names of methods are always composed like this: <objectname>.<methodname>. Consider the following example: When a DataSubject 602 asks a DataUser 605 to stop sending her marketing material (DataSubject 602 opts out), the latter modifies his rules with respect to the DataSubject 602 in question.

Access( ): This method is the DataUser 605's action of granting the DataSubject 602 access to her information. The method will always be invoked by the DataSubject 602 (or Guardian 603). Consider the following example: After a customer (DataSubject) has asked and proved her identity, the online bookstore (DataUser) grants the customer access to her information.

Utilize( ): This unary method is present in the DataUser 605 class and corresponds to the action of using a certain piece of information the DataUser 605 is holding. The qualifier "unary" means that this action—as opposed to the previously mentioned ones—does not imply the participation of two parties, because it is executed by the same Party that has triggered the execution. Note that on their own, the words utilize or use do not have a precise meaning in this context. In the real world the central and most meaningful element of a utilize action is its purpose (cf. the example given below). In the real world, the execution of this method is requested implicitly by the DataUser himself (and there may be cases where it is requested explicitly by legislative texts). Consider the following example: It may be acceptable that an enterprise installs video cameras at particular places in order to guarantee their employees' safety; the material gathered with this equipment may therefore be used with this purpose in mind, but not for other purposes (like surveillance of employees' behavior).

Anonymize( ): The method is only contained in objects of class DataUser 605. It is the first special case of the utilize action which is modeled separately because of its special relevance in the privacy context. Its execution is the action of taking a set of personal information and stripping off all the elements that would possibly allow the information to be related to specific DataSubject 602's. Consider the following example, of records containing the fields name, address, as well as age in years, and blood pressure; if the name and address fields are stripped off, the set of age and blood pressure may be called non personally identifiable information.

Depersonalize( ): This method is also specific to the DataUser 605 class and the second special case of the utilize action which is modeled separately because of its special relevance in the privacy context. It consists of taking a set of personal information and stripping off enough in order to prevent the linkage to individual DataSubject 602's. As opposed to the anonymize action, this action is reversible. That is, there is a means to re-personalize the information. Consider the following example: In a cancer register database, identifying information is replaced by a number or code. At the same time, a table of correspondence between the codes and the identifying information is set up and stored in a secured place. This table can later be used in order to re-personalize the information (which is necessary if one wants to update the register with new information).

Repersonalize( ): This is another method that only the DataUser 605 can perform. It is the third special case of the utilize action which is modeled separately because of its special relevance in the privacy context. The content of the method is the action of re-introducing identifying information to a set of depersonalized information. Consider the example given above for depersonalize( ).

GetPrivacyInformation( ): This method is a privacy relevant action specific to the Canadian regulatory context and might not be needed under other legislation. This legislation asks the DataUser to make available his data handling policies and practices including the identity of the responsible person for privacy in the enterprise. The method is specific to DataUser 605 class objects and is usually requested by the Data Subject 602.

Figure 7A:
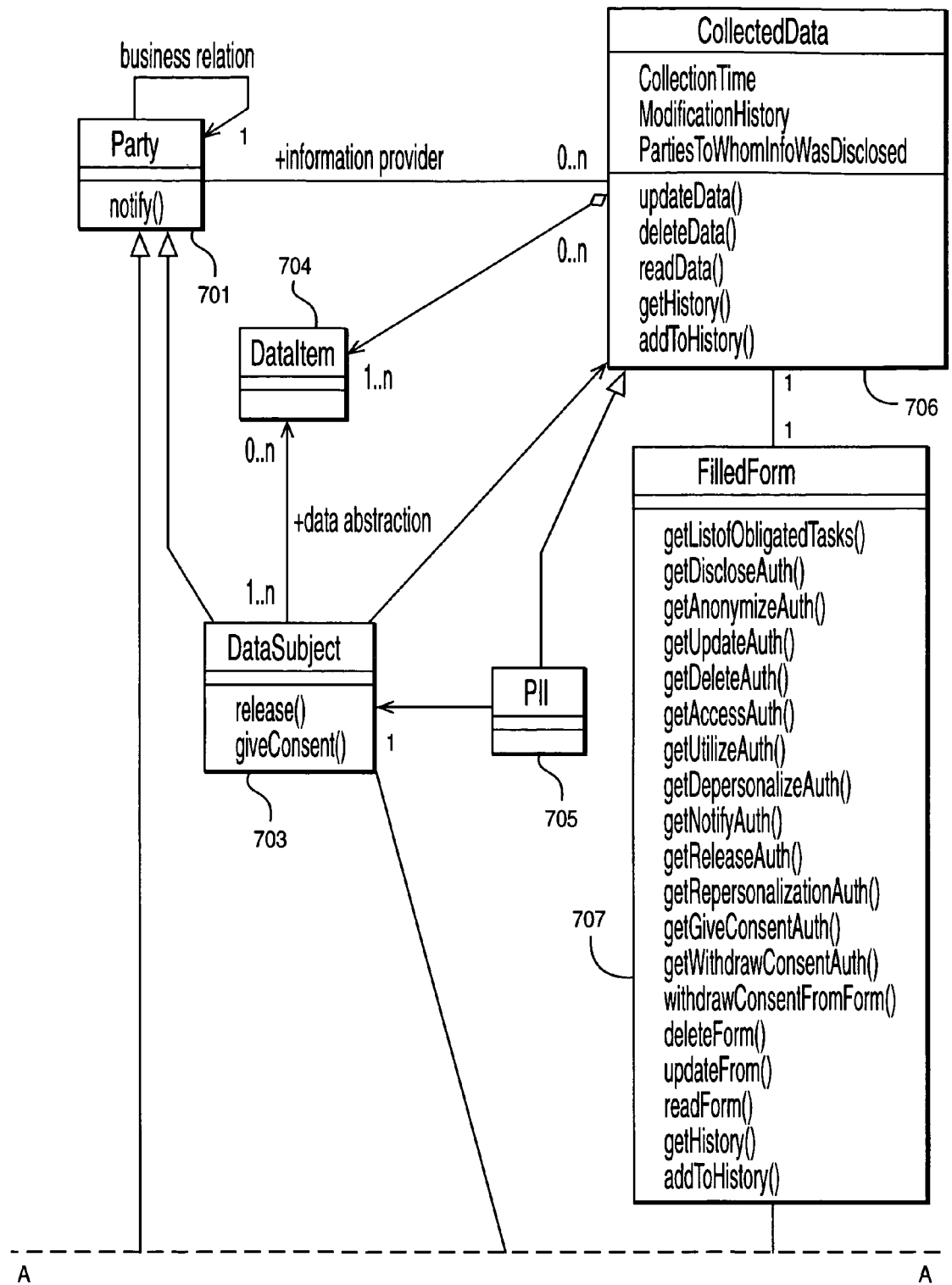
FIG. 7 is a class diagram illustrating objects to be used in a process for improving the handling of Personally Identifiable Information, according to the teachings of the present invention. In particular, FIG. 7 uses Unified Modeling Language (UML) to show classes representing data and rules.
Figure 7B:
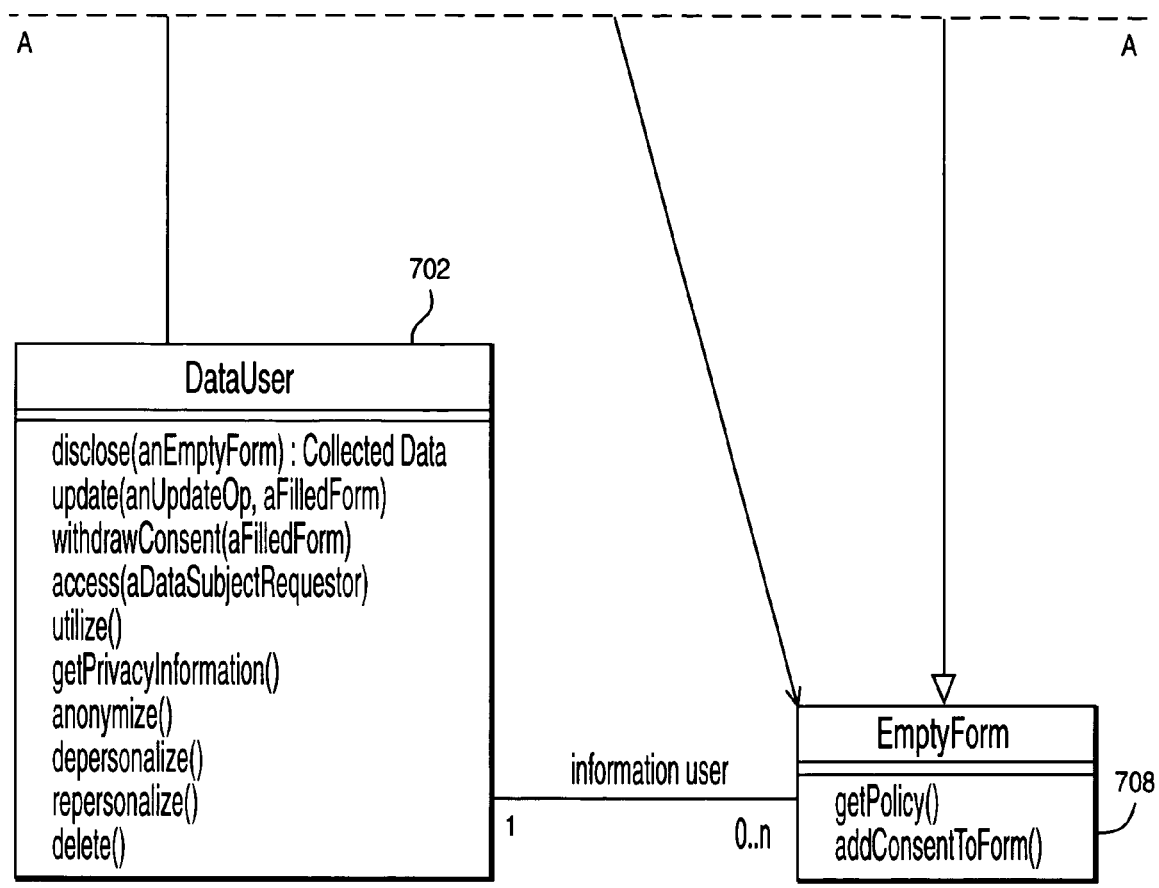

FIG. 7 is a class diagram illustrating objects to be used in a process for improving the handling of Personally Identifiable Information, according to the teachings of the present invention. In particular, FIG. 7 shows classes representing data and rules. Inheritance relationships are shown by lines that have a triangle on the end by the parent component, or superclass. Containment, or aggregate, relationships are shown with lines that have a diamond on the end by the containing component.

Regarding FIG. 7, the term "method" has a special meaning, as it does regarding FIG. 6. The term "method" is used for active aspects or behaviors of classes or objects. Usually a method is looked at as a service that is being provided by the object in question and requested by another object sending a message to the object. As an analogy to the paper based world, an EmptyForm 708 is a document consisting of two parts: The first part consists of empty spaces (FormFields) prepared to be filled with data. These spaces have labels and descriptions that define the kind of data (DataItemTypeDescription) that can be filled into them (e.g. a field labeled "name" is prepared to be filled with a string of characters that will represent the name of a DataSubject 703). The second part consists of rules describing what can or cannot be done with the future contents of the data fields. More precisely, these rules can describe the purpose for which the information may be used as well as the data users, 702,—or data user types (e.g. insurance companies) that have the right to use the information.

The methods for the EmptyForm 708 are:

| | |
|---|---|
| getPolicy( ) | This is the EmptyForm 708's action of listing the set of rules that are valid for the present form. |
| addConsent( ) | This is the EmptyForm 708's action of updating (modifying) the set of rules that are valid for the present form. Example: When a DataSubject 703 opts in for, say marketing purposes, then the DataUser 702 will perform the getConsent( ) method on this DataSubject 703, which in turn will trigger the addConsent( ) method of the corresponding FilledForm 707. |

Methods for the FilledForm 707 containing CollectedData 706 are:

| | |
|---|---|
| getPolicy( ) | cf. description above under EmptyForm 708. |
| addConsent( ) | cf. description above under EmptyForm 708. |
| getListOfObligatedTasks( ) | This method is present in the class FilledForm 707 and it is called by the DataUser 702 in order to find out what are the mandatory activities to be carried out. The FilledForm 707 will return the list of tasks the DataUser 702 must perform |
| get<Action>Auth( ) | Action stands for disclose( ), anonymize( ), update( ), delete( ), access( ), utilize( ), depersonalize( ), repersonalize( ), withdrawConsent( ), release( ) and notify( ). Each of these methods are specific to the FilledForm |

| | |
|---|---|
| | 707 and each of them is triggered by the corresponding action method of a Party. The service provided by the FilledForm 707 object is to check against the rules (present in EmptyForm 708) whether the action is allowed to take place. Example: While exercising my right of access to the information my car insurance company (DataUser 702) is holding on me, I (DataSubject 703) have detected two pieces of erroneous information. I now want to have the information corrected in the insurance files. In the Object model, the DataSubject 703 triggers the DataUser 702's update( ) method which in turn invokes the getUpdateAuth( ) method of the FilledForm 707 containing the pieces of information. This method checks whether I do have the right to ask for updating and whether the newly provided information is correct (and possibly other things). When it has finished executing, it either returns a negative result or it says that the updates may be executed. In this latter case, two more methods are executed, namely updateForm( ) on the FilledForm 707 and updateData( ) on the CollectedData 706. Furthermore, getUpdateAuth( ) can also return a message saying that there is a task to be executed. To find out what this task is, DataUser 702 invokes the getListOfObligatedTasks( ) methods on the FilledForm 707. |
| getHistory( ) | This is the service provided by the FilledForm 707 that produces information on what modifications have taken place in the form (most importantly the information as to whom data from this form has been revealed, but also information concerning data entries, updates, deletes and policy modifications |

The following 6 methods of the class FilledForm 707 are all performing the action that is expressed in their name. Each of them is triggering a corresponding method in an object of class CollectedData 706, e.g. updateForm( ) triggers updateData( ).

| | |
|---|---|
| updateForm( ) | the method executing updates on FilledForm 707 |
| updateData( ) | the method executing updates but operating on CollectedData 706 (it is always performing together with the updateForm( ) method of the corresponding FilledForm 707) |
| readForm( ) | the method executing read operations on FilledForm 707 |
| readData( ) | the method executing read operations but working on CollectedData 706 (it is always performing together with the readForm( ) method of the corresponding FilledForm 707) |
| deleteForm( ) | the method executing a delete operation on an entire Form |
| deleteData( ) | the method performing delete operations on CollectedData 706 |

The class CollectedData 706 contains three important attributes which are worth being mentioned here.

| | |
|---|---|
| CollectionTime | Indicates the time when CollectedData 706 was collected. |
| ModificationHistory | Contains a list of all modifications that have been executed on CollectedData 706. |
| PartiesToWhomInforWasDisclosed | Contains a list of all parties to whom CollectedData 706 was disclosed. This list may for instance become important, when inaccurate data is being corrected. It can then be appropriate to propagate the changes to all or some of these parties. |

FIG. 8 is a block diagram illustrating an example of an information handling system that may be used to practice the present invention. Enterprise Personal Data, EPD 822, 823, 833, 834, and 836, is all data of an organization that is personally identifiable information (PII) in some context. Privacy Data Transformation Engine, PTE 824, is a component that provides views of the EPD 822 and 823 after applying privacy transformations such as depersonalization of the PII. Privacy-enabling Resource Manager, PERM 821, enables applications, or other components, to retrieve data. It controls the access to the EPD 822 and 823, uses the Policy Authorization Director PAD 832 to check policies before accessing the EPD 822 and 823, and may associate policies with data. Policy Authorization Director PAD 832 manages policies and evaluates whether a certain access shall be granted, and may associate data with policies. Privacy Action Audit Manager PAAM 836 logs the accesses to EPD 822 and 823 and provides services for auditing and for accessing history data. Policy Presentation and Negotiation Service PPNS 842 is responsible for providing a policy in a format that can be displayed to the data subject 801, or processed in supported standardized ways (for example, standard representation of privacy policies in XML, as specified by the W3C P3P standard). PPNS 842 may also support policy negotiation. User Privacy Contact Manager UPCM 844 contacts the data subject 801 in case of enterprise-triggered events concerning privacy management. User Privacy Access Manager UPAM 843 allows data subject 801 to access her PII, to retrieve usage logs, to add or withdraw consent, or to update the policies associated with her PII. Privacy-Enabling Credential Service PECS 841 supports generation and verification of credentials that can be used to establish a fact about a person. The credential can hide the identity of the person, if desired. Privacy-Enabled Authentication PEA 810 is an extension of normal security authentication to include authentication based on pseudonyms where the person's identity is not known. Privacy Obligation Event Services POES 831 keeps track of all events related to privacy action obligations and enables other components to retrieve them (pull mode) or notifies other components about actions to be performed (push mode). Policy Editor 837 provides a user interface for creating and editing policies in presentable or standardized formats. The output of this editor is often delivered on line by the PPNS 842. Application 811 provides the actual services of the enterprise or organization.

Figure 9:
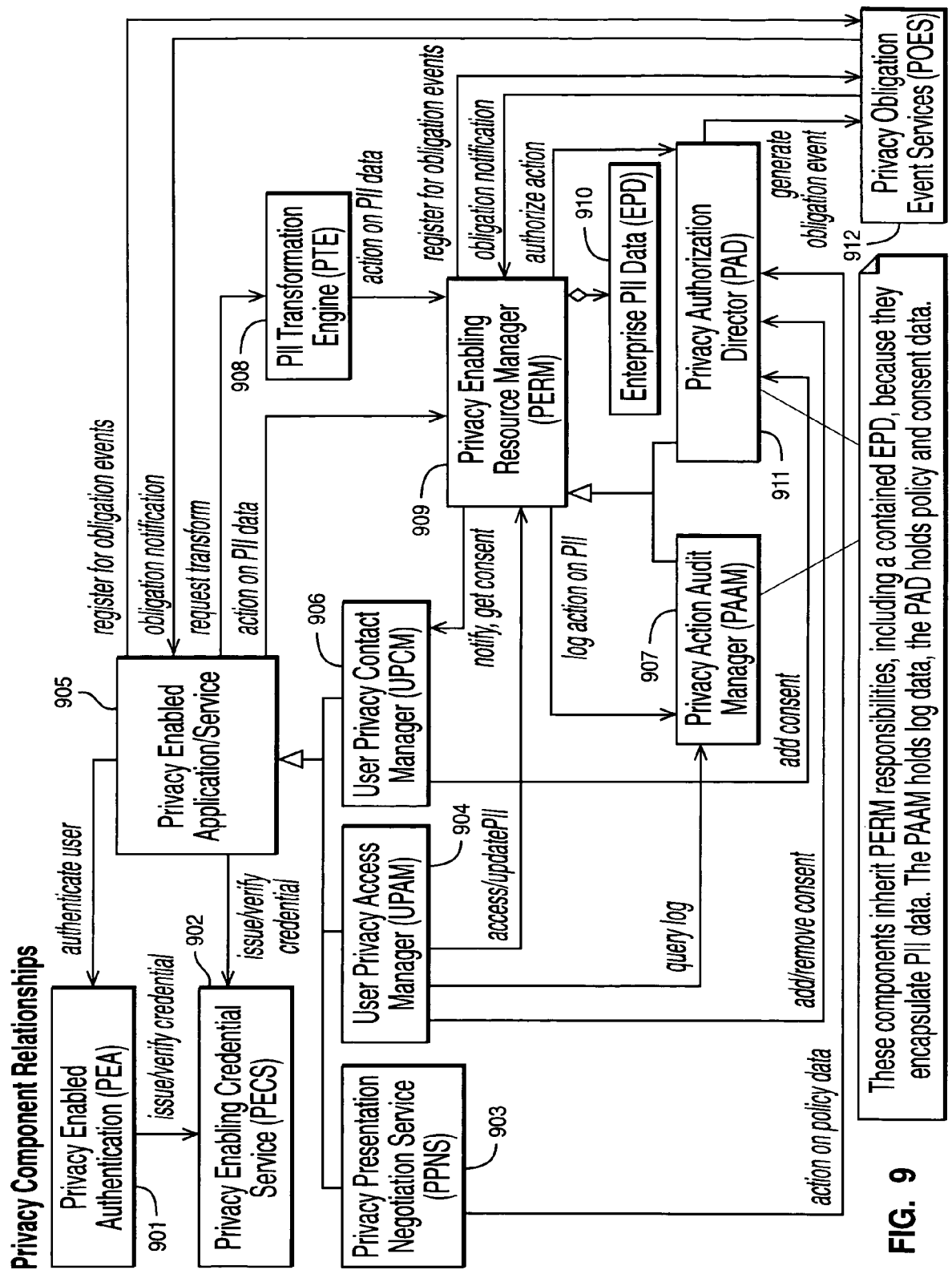
FIG. 9 uses Unified Modeling Language (UML) to show component relationships in an exemplary system such as the system shown in FIG. 8.

FIG. 9 uses Unified Modeling Language (UML) to show component relationships in an exemplary system such as the system shown in FIG. 8. All the privacy component relationships are shown in a single drawing. Only the major operational interfaces are shown. Usage is shown by lines with arrows, where the arrow is on the end by the component that is invoked. The line is labeled to indicate the contract or interface that is being invoked. Containment, or aggregate, relationships are shown with lines that have a diamond on the end by the containing component. Contained components are totally encapsulated by their containing component, and their interfaces can only be invoked by the containing component. Inheritance relationships are shown by lines that have a triangle on the end by the parent component, or superclass. Inheritance implies only interface inheritance (common function) and does not indicate the parent and child components share any implementation.

Enterprise Personal Data, EPD 910, is all data of an organization that is personally identifiable information (PII) in some context. PII Transformation Engine, PTE 908, is a component that provides views of the EPD 910 after applying privacy transformations such as depersonalization of the PII. Privacy-enabling Resource Manager, PERM 909, enables applications, or other components, to retrieve data. It controls the access to the EPD 910, uses the PAD 911 to check policies before accessing the EPD, and may associate policies with data. Policy Authorization Director PAD 911 manages policies and evaluates whether a certain access shall be granted, and may associate data with policies. Privacy Action Audit Manager PAAM 907 logs the accesses to EPD 910 and provides services for auditing and for accessing history data. Policy Presentation and Negotiation Service PPNS 903 is responsible for providing a policy in a format that can be displayed to the data subject, or processed in supported standardized ways (for example, standard representation of privacy policies in XML, as specified by the W3C P3P standard). PPNS 903 may also support policy negotiation. User Privacy Contact Manager UPCM 906 contacts the data subject in case of enterprise-triggered events concerning privacy management. User Privacy Access Manager UPAM 904 allows data subjects to access their PII, to retrieve usage logs, to add or withdraw consent, or to update the policies associated with their PII. Privacy-Enabling Credential Service PECS 902 supports generation and verification of credentials that can be used to establish a fact about a person. The credential can hide the identity of the person, if desired. Privacy-Enabled Authentication PEA 901 is an extension of normal security authentication to include authentication based on pseudonyms where the person's identity is not known. Privacy Obligation Event Services POES 912 keeps track of all events related to privacy action obligations and enables other components to retrieve them (pull mode) or notifies other components about actions to be performed (push mode). Privacy Enabled Applications such as the one shown at 905 are applications that are privacy-aware. They might provide arbitrary services. The difference to other applications is that privacy-enabled applications are able to process certain privacy obligations.

Figure 10:
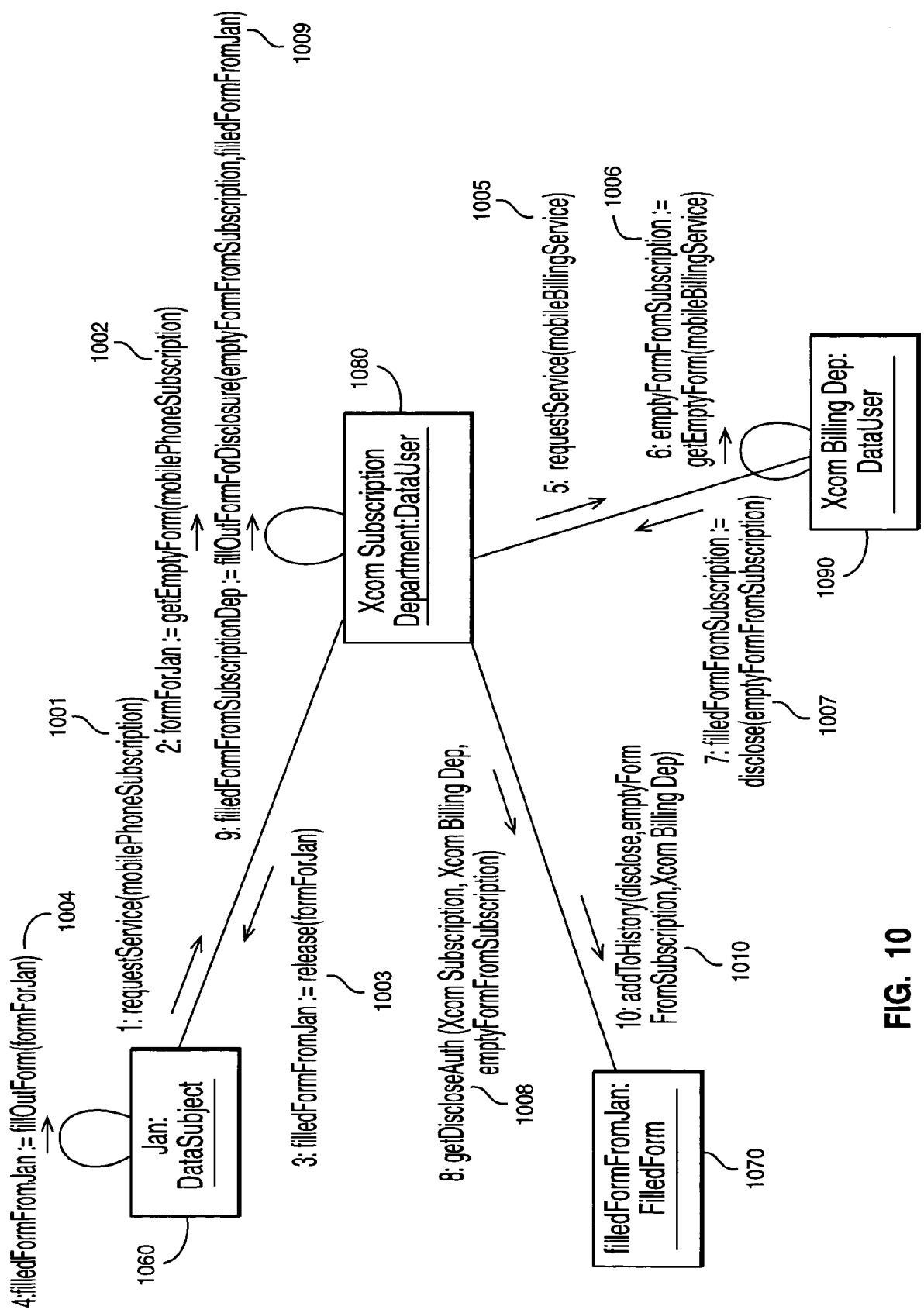
FIG. 10 is a UML collaboration diagram illustrating how objects collaborate to fulfill privacy-related tasks, using an example involving a subscription for mobile phone service.

FIG. 10 is a UML collaboration diagram illustrating how objects collaborate to fulfill privacy-related tasks, using an example involving a subscription for mobile phone service. This example, Scenario #1, and following examples involve an adult named Jan, his nine-year old daughter Mina, and a communications company named Xcom having Internet Service Provider (ISP) and mobile phone divisions. The mobile phone division contains marketing (MD), subscription (SD), and billing (BD) departments.

Overview/Outcome: Jan, 1060, subscribes to a mobile phone contract with Xcom and therefore has to release information about himself. In order to provide the service, Xcom discloses Jan's information to the Xcom billing department, 1090.

Privacy Related Actions: Release, and disclose.
Message Flow Description: 1. Jan, 1060, requests, at 1001, a mobile phone subscription from Xcom's SD, 1080.

2. SD 1080 looks up the corresponding Empty Form, at 1002, for the requested service and sends it to Jan, 1060. The Empty Form actually contains a description of the requested data and the rules that constrain what the user is allowed to do with the data.

3 & 4. Jan 1060 releases, 1003, information about himself by filling out, 1004, the Empty Form and returning the Filled Form. By filling out and returning the form, Jan 1060 implicitly consents to the use of his data subject to the rules contained in the form.

5. To actually provide the mobile phone service, the SD 1080 asks the BD 1090 to bill Jan 1060 for his mobile phone conversations—thus the SD 1080 requests from the BD 1090 the 'mobile billing service,' 1005.

6. In order to provide the service the BD 1090 needs to get hold of the customer's (here: Jan's) data. Therefore the BD 1090 looks up the corresponding empty form, 1006, for the billing service and sends it to the SD 1080.

7. The SD 1080 is about to disclose, 1007, information about Jan 1060 that was collected in step 3. In order to disclose the information steps 8. and 9. have to be performed:

8. The information requested by the BD 1090 may only be provided if its purpose of use is in accordance with the rules under which Jan 1060 has released his data in step 3. This condition is verified by querying the FilledForm 1070 (from step 3), whereas the BD's EmptyForm and the party to whom the data (here: BD 1090) is disclosed have to be included in the request, 1008.

9. The disclosure was authorized, thus the SD 1080 fills out, 1009, the EmptyForm and returns the FilledForm to the BD.

Figure 11:
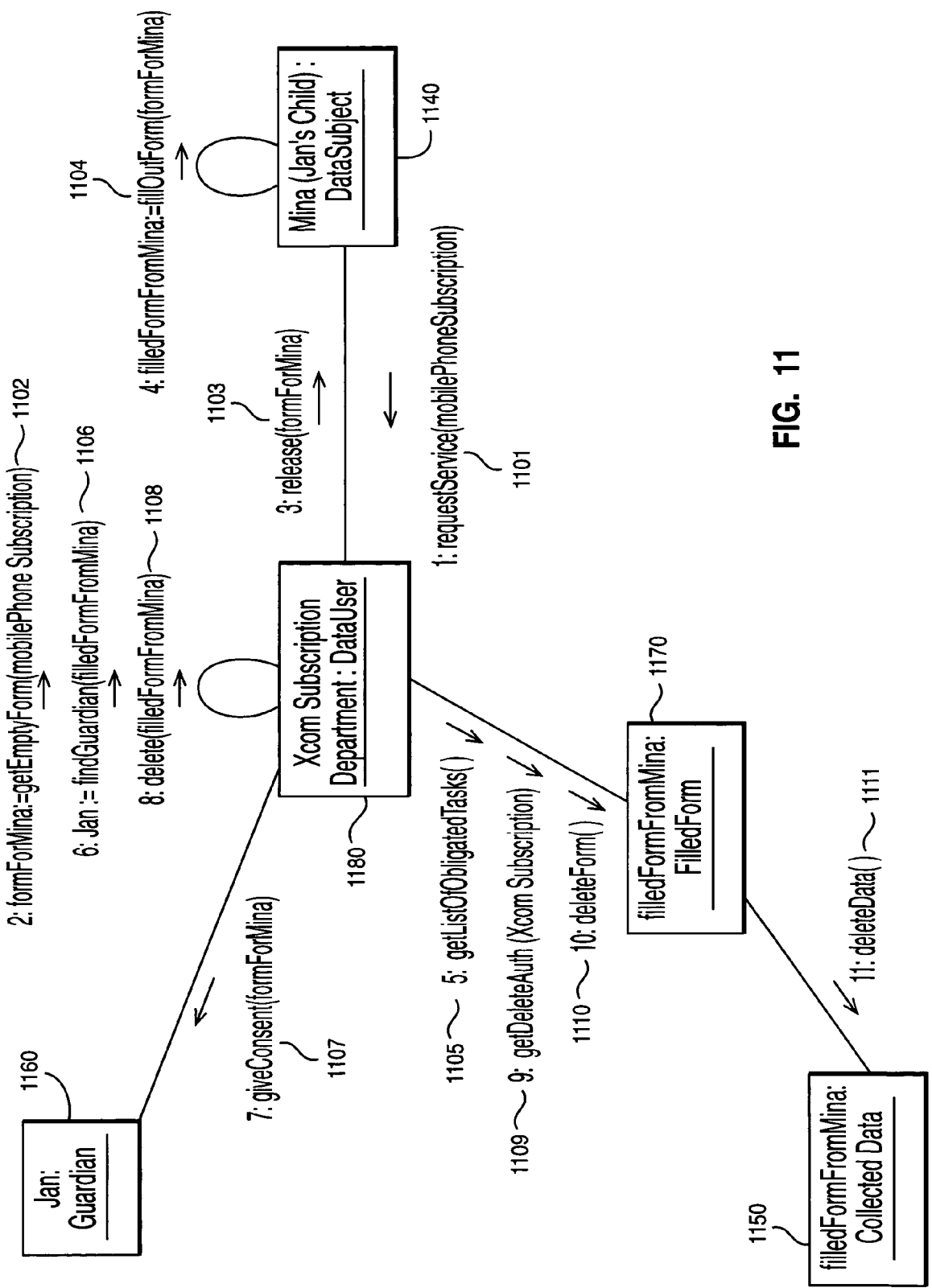
FIG. 11 is a UML collaboration diagram illustrating how objects collaborate to fulfill privacy-related tasks, using an example involving a subscription for mobile phone service, where a guardian must give consent.

FIG. 11 is a UML collaboration diagram illustrating how objects collaborate to fulfill privacy-related tasks, using an example involving a subscription for mobile phone service, with a guardian giving consent. Scenario #2 Overview/Outcome: Jan's daughter Mina subscribes to a mobile phone contract. As she is younger than 13, Xcom's privacy rules state that her guardian Jan has to give consent to the use of Mina's data. However, Jan does not consent; therefore Xcom may not use Mina's data and has to delete the collected data.

Privacy Related Actions: Consent by guardian, and obligated tasks.

Remarks: Steps similar to scenario #1 are not described in detail; please refer to description of scenario #1 (FIG. 10) for further details.

Message Flow Description: 1. Mina at 1140 wants to subscribe to Xcom's mobile phone service (request 1101).

2. Xcom's SD at 1180 looks up the corresponding EmptyForm and sends it, 1102, to Mina at 1140.

3. & 4. Mina at 1140 releases, 1103, information about herself by filling out, 1104, the EmptyForm and returning the FilledForm.

5. The SD at 1180 queries, 1105, Mina's FilledForm 1170; given Mina's data, the rules attached to the FilledForm 1170 require certain obligated tasks to be performed by the DataUser (SD 1180). As Mina is younger than 13, the Rules obligate the SD 1180 to find Mina's Guardian at 1160 and to ask him or her for consent to the release and use of Mina's data.

6. The SD 1180 finds, 1106, Mina's father (Guardian) Jan at 1160.

7. Jan at 1160 is asked, 1107, for consent to the use of the data that Mina at 1140 has provided under the rules specified in the FilledForm 1170. Jan does not consent—therefore Xcom is obligated to delete Mina's data, i.e., the FilledForm 1170 from Mina.

8. The SD at 1180 starts the deletion procedure, 1108, of Mina's FilledForm. The deletion is carried out in steps 9-11:

9. The SD at 1180 queries, 1109, the FilledForm 1170 to determine if it is authorized to delete the form.
10. If authorization is given, the delete message, 1110, is sent to the FilledForm 1170.
11. The FilledForm 1170 deletes, 1111, the CollectedData on Mina.

Figure 12:
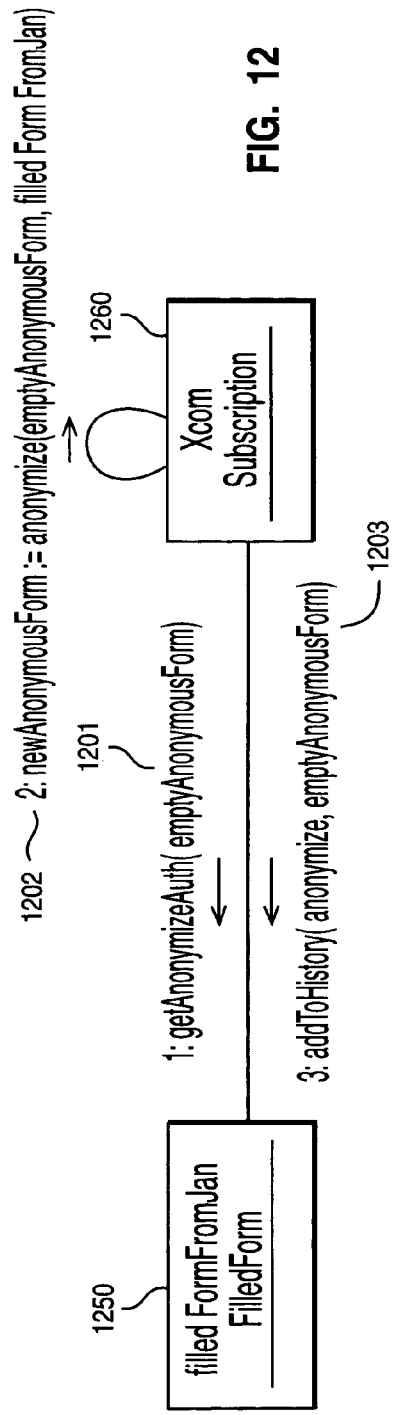
FIG. 12 is a UML collaboration diagram illustrating how objects collaborate to fulfill privacy-related tasks, using an example involving a subscription for mobile phone service, where data is transformed into an anonymous form.

FIG. 12 is a UML collaboration diagram illustrating how objects collaborate to fulfill privacy-related tasks, using an example involving a subscription for mobile phone service, where data is transformed into an anonymous form.
Overview/Outcome: The Xcom's SD 1260 decides to use its customer data for data mining. Therefore customer data is anonymized.
Privacy Related Actions: Anonymize.
Message Flow Description:
1. SD 1260 queries the FilledForm 1250 that contains Jan's data for the anonymization authorization, by providing the anonymized EmptyForm as part of the request, 1201.
2. If the authorization is granted, the anonymized FilledForm is created, 1202, from the existing FilledForm 1250 that contains PII.
3. The history on the FilledForm is updated, 1203.

Figure 13:
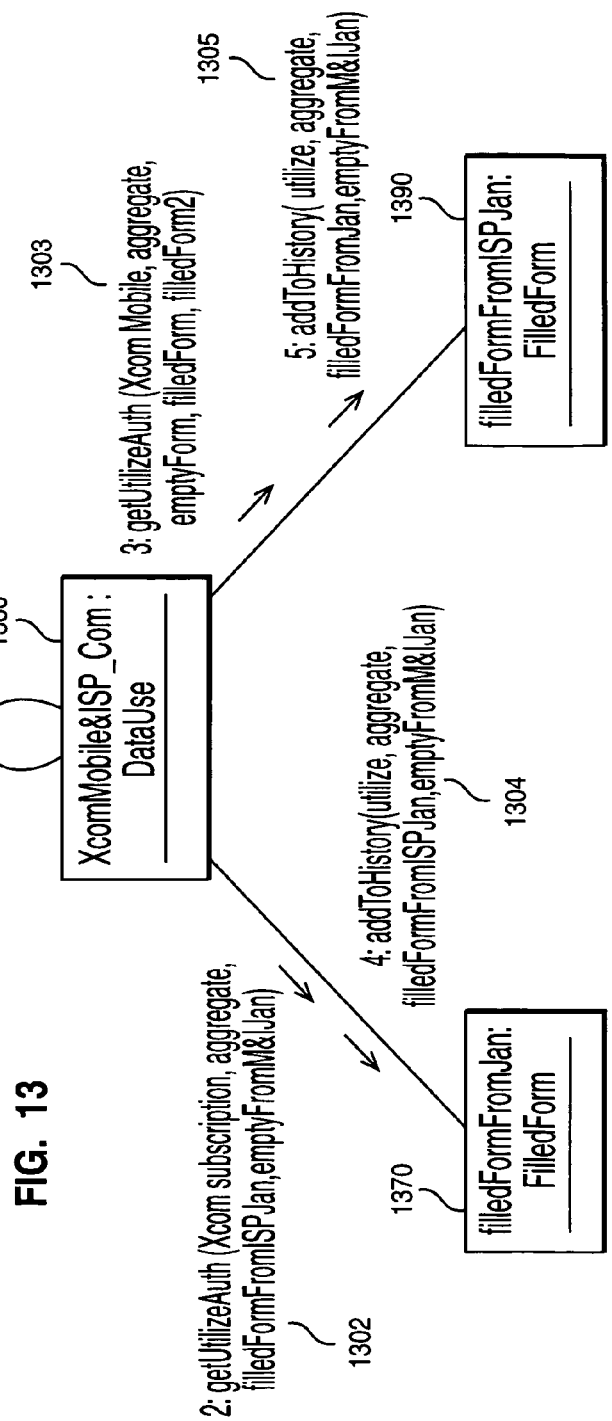
FIG. 13 is a UML collaboration diagram illustrating how objects collaborate to fulfill privacy-related tasks, using an example involving a subscription for mobile phone service, with data aggregated after a merger of divisions within a company.

FIG. 13 is a UML collaboration diagram illustrating how objects collaborate to fulfill privacy-related tasks, using an example involving a subscription for mobile phone service, with data aggregated after a merger of a divisions within a company.
Overview/Outcome: Jan is a customer of the mobile phone—and ISP divisions of Xcom. He has released data to both divisions—to each of them in a separate FilledForm, 1370 and 1390. Xcom decides to merge the mobile and ISP division into a single division. This merger leads to an aggregation of existing data about Jan.
Privacy Related Actions: Utilize, and aggregate.
Message Flow Description:
1. The fact that the newly created Mobile and ISP Division wants to aggregate Jan's FilledForms 1370 and 1390 from the former ISP and Mobile Divisions is modeled by a 'utilize' on the data (FilledForms 1370 and 1390) of the merged divisions.
2. The FilledForm 1370 that contains Jan's data within the former Mobile Division is queried, 1302, for the authorization for the use of aggregation. The new EmptyForm that is used for aggregation as well as the data from the former ISP department are passed as arguments of the request.
3. Analogous to step 2, but with respect to the FilledForm 1390 of the former ISP division, which is queried, 1303.
4. The FilledForm's history at the former mobile division is updated, 1304.
5. The FilledForm's history at the former ISP division is updated, 1305.

One of the possible implementations of the invention is an application, namely a set of instructions (program code) in a code module which may, for example, be resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:
1. A method, in a data processing system, for handling personally identifiable information, said method comprising:
providing, in a computer of the data processing system, a first set of object classes, of an object model in an object oriented programming language, representing active entities in an information-handling process;
providing, in said computer, a second object class, of the object model, representing personally identifiable information and associated rules in said information-handling process; and
processing transactions, in the data processing system, involving said personally identifiable information, using said computer and said first set of object classes and said second object class of the object model, so as to enforce a privacy policy, wherein
said rules define if and how said personally identifiable information is provided, by a first data user of the data processing system that previously requested the personally identifiable information from an active entity that is personally identifiable by the personally identifiable information, to a second data user of the data processing system that requests said personally identifiable information from the first data user, wherein said second object class, having said rules associated with said data, represents a filled paper form, including both collected data, collected from the active entity and including the personally identifiable information, and rules regarding said collected data specifying if and how the collected data is provided to the second data user, wherein the second data user sends an empty form including a policy to the first data user requesting the personally identifiable information, and wherein the first data user checks the policy included with the empty form to determine if disclosure of the personally identifiable information is permitted based on the policy included with the empty form and the rules regarding the collected data.

2. The method of claim 1, wherein said first set of object classes include one or more object classes representing parties, selected from the group consisting of:
- a data user object class,
- a data subject object class,
- a guardian object class, and
- a privacy authority object class.

3. The method of claim 1, further comprising:
transforming, based on said rules, said personally identifiable information into a depersonalized format prior to providing said personally identifiable information to the second data user.

4. The method of claim 1, wherein said privacy policy is associated with the personally identifiable information and defined by said rules, and is enforced against one or more active entities represented by said first set of object classes, and wherein each of the one or more active entities represented by said first set of object classes is a human being or legal entity.

5. The method of claim 1, wherein:
- a first active entity represented by a first object class in said first set of object classes is said first data user that previously requested said personally identifiable information from said data subject that is a second active entity represented by a second object class in said first set of object classes, and
- a third active entity represented by a third object class in said first set of object classes is said second data user that requests said personally identifiable information from said first data user.

6. The method of claim 3, wherein said transforming, based on said rules. said personally identifiable information into a depersonalized format prior to providing said personally identifiable information to the second data user comprises removing information that relates the personally identifiable information to the data subject in a reversible manner.

7. The method of claim 1, further comprising:
transforming, based on said rules, said personally identifiable information into an anonymized format prior to providing said personally identifiable information to the second data user, wherein the anonymized format is a format in which all elements that may allow the personally identifiable information to be related to the data subject are stripped off in a non-reversible manner.

8. A computer system for handling personally identifiable information, said computer system comprising:
- a central processing unit (CPU), a computer-readable memory, and a computer readable, tangible storage device;
- program instructions, stored on the storage device for execution by the CPU via the memory, to provide a first set of object classes, of an object model in an object oriented programming language, representing active entities in an information-handling process;
- program instructions, stored on the storage device for execution by the CPU via the memory, to provide a second object class, of the object model, representing personally identifiable information and associated rules in said information-handling process; and
- program instructions, stored on the storage device for execution by the CPU via the memory, to process transactions involving said personally identifiable information, using said first set of object classes and said second object class of the object model, so as to enforce a privacy policy, wherein said rules define if and how said personally identifiable information is provided, by a first data user of the computer system that previously requested the personally identifiable information from an active entity that is personally identifiable by the personally identifiable information, to a second data user of the computer system that requests said personally identifiable information from the first data user, wherein said second object class, having said rules associated with said data, represents a filled paper form, including both collected data, collected from the active entity and including the personally identifiable information, and rules regarding said collected data specifying if and how the collected data is provided to the second data user, wherein the second data user sends an empty form including a policy to the first data user requesting the personally identifiable information, and wherein the first data user checks the policy included with the empty form to determine if disclosure of the personally identifiable information is permitted based on the policy included with the empty form and the rules regarding the collected data.

9. The computer system of claim 8, further comprising:
program instructions, stored on the storage device for execution by the CPU via the memory, to transform, based on said rules, said personally identifiable information into a depersonalized format prior to providing said personally identifiable information to the second data user.

10. The computer system of claim 8, wherein said privacy policy is associated with the personally identifiable information and defined by said rules, and is enforced against one or more active entities represented by said first set of object classes, and wherein each of the one or more active entities represented by said first set of object classes is a human being or legal entity.

11. The computer system of claim 8, wherein:
- a first active entity represented by a first object class in said first set of object classes is said first data user that previously requested said personally identifiable information from said data subject that is a second active entity represented by a second object class in said first set of object classes, and
- a third active entity represented by a third object class in said first set of object classes is said second data user that requests said personally identifiable information from said first data user.

12. The computer system of claim 9, wherein:
the program instructions to transform, based on said rules, said personally identifiable information into a depersonalized format prior to providing said personally identifiable information to the second data user comprises removing information that relates the personally identifiable information to the data subject in a reversible manner.

13. The computer system of claim 8, further comprising:
program instructions, stored on the storage device for execution by the CPU via the memory, to transform, based on said rules, said personally identifiable information into an anonymized format prior to providing said personally identifiable information to the second data user, wherein the anonymized format is a format in which all elements that may allow the personally identifiable information to be related to the data subject are stripped off in a non-reversible manner.

14. A computer program product comprising a non-transitory computer-readable, tangible storage device and computer-readable program instructions stored on the computer-readable, tangible storage device to handle personally identifiable information, the computer-readable program instructions, when executed by a central processing unit (CPU):
provide a first set of object classes, of an object model in an object oriented programming language, representing active entities in an information-handling process;
provide a second object class, of the object model, representing personally identifiable information and associated rules in said information-handling process; and
process transactions involving said personally identifiable information, using said first set of object classes and said second object class of the object model, so as to enforce a privacy policy, wherein said rules define if and how said personally identifiable information is provided, by a first data user that previously requested the personally identifiable information from an active entity that is personally identifiable by the personally identifiable information, to a second data user that requests said personally identifiable information from the first data user, wherein said second object class, having said rules associated with said data, represents a filled paper form, including both collected data, collected from the active entity and including the personally identifiable information, and rules regarding said collected data specifying if and how the collected data is provided to the second data user, wherein the second data user sends an empty form including a policy to the first data user requesting the personally identifiable information, and wherein the first data user checks the policy included with the empty form to determine if disclosure of the personally identifiable information is permitted based on the policy included with the empty form and the rules regarding the collected data.

15. The computer program product of claim 14, further comprising computer-readable program instructions which are stored on the computer-readable, tangible storage device and when executed by the CPU:
transform, based on said rules, said personally identifiable information into a depersonalized format prior to providing said personally identifiable information to the second data user.

16. The computer program product of claim 14, wherein said privacy policy is associated with the personally identifiable information and defined by said rules, and is enforced against one or more active entities represented by said first set of object classes, and wherein each of the one or more active entities represented by said first set of object classes is a human being or legal entity.

17. The computer program product of claim 14, wherein:
a first active entity represented by a first object class in said first set of object classes is said first data user that previously requested said personally identifiable information from said data subject that is a second active entity represented by a second object class in said first set of object classes, and
a third active entity represented by a third object class in said first set of object classes is said second data user that requests said personally identifiable information from said first data user.

18. The computer program product of claim 15, wherein the computer-readable program instructions to transform, based on said rules, said personally identifiable information into a depersonalized format prior to providing said personally identifiable information to the second data user comprises removing information that relates the personally identifiable information to the data subject in a reversible mariner.

19. The computer program product of claim 14, further comprising computer-readable program instructions which are stored on the computer-readable, tangible storage device and when executed by the CPU:
transform, based on said rules, said personally identifiable information into an anonymized format prior to providing said personally identifiable information to the second data user, wherein the anonymized format is a format in which all elements that may allow the personally identifiable information to be related to the data subject are stripped off in a non-reversible manner.

20. The computer system of claim 12, wherein:
the program instructions to transform comprise invoking a Depersonalize method contained in a data user object class in the first set of object classes, and wherein the Depersonalize method operates to strip off enough information elements in the personally identifiable information to prevent linking the personally identifiable information to an individual data subject object.

21. The computer system of claim 13, wherein:
the program instructions to transform comprise invoking an Anonymize method contained in a data user object class in the first set of object classes, and wherein the Anonymize method operates to strip off all information elements in the personally identifiable information that link the personally identifiable information to an individual data subject object.

* * * * *